US011307831B2

(12) United States Patent
Allamanis et al.

(10) Patent No.: US 11,307,831 B2
(45) Date of Patent: Apr. 19, 2022

(54) NEURAL CODE COMPLETION VIA RE-RANKING

(71) Applicant: MICROSOFT TECHNOLOGY LICENSING, LLC., Redmond, WA (US)

(72) Inventors: Miltiadis Allamanis, Cambridge (GB); Shengyu Fu, Redmond, WA (US); Xiaoyu Liu, Bothell, WA (US); Neelakantan Sundaresan, Bellevue, WA (US); Alexey Svyatkovskiy, Bellevue, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 0 days.

(21) Appl. No.: 16/900,993

(22) Filed: Jun. 15, 2020

(65) Prior Publication Data
US 2021/0279042 A1 Sep. 9, 2021

Related U.S. Application Data

(60) Provisional application No. 62/985,857, filed on Mar. 5, 2020.

(51) Int. Cl.
*G06F 8/33* (2018.01)
*G06N 3/04* (2006.01)
*G06F 8/35* (2018.01)
*G06F 8/30* (2018.01)

(52) U.S. Cl.
CPC .................. *G06F 8/33* (2013.01); *G06F 8/35* (2013.01); *G06F 8/37* (2013.01); *G06N 3/049* (2013.01)

(58) Field of Classification Search
CPC .... G06F 8/33; G06F 8/37; G06F 8/35; G06N 3/049
USPC .................................................. 717/107–135
See application file for complete search history.

(56) References Cited

U.S. PATENT DOCUMENTS

| | | | |
|---|---|---|---|
| 10,268,671 B2* | 4/2019 | Kaiser | G06F 40/211 |
| 2010/0050160 A1* | 2/2010 | Balasubramanian | G06F 8/33 717/126 |
| 2019/0303108 A1* | 10/2019 | Fu | G06F 8/33 |
| 2019/0303109 A1 | 10/2019 | Fu et al. | |
| 2019/0324744 A1* | 10/2019 | Alam | G06F 17/11 |
| 2019/0391792 A1* | 12/2019 | Sabharwal | G06N 3/0445 |

OTHER PUBLICATIONS

Raychev, Veselin, Martin Vechev, and Eran Yahav. "Code completion with statistical language models." Proceedings of the 35th ACM SIGPLAN Conference on Programming Language Design and Implementation. 2014.pp. 419-428 (Year: 2014).*

(Continued)

*Primary Examiner* — Satish Rampuria

(57) ABSTRACT

A code completion system uses neural components to rank the unordered list of code completion candidates generated from an existing static analyzer. The candidates represent the next sequence of tokens likely to complete a partially-formed program element as a developer is typing in a software development tool. A re-ranking component generates a ranked order of the candidates based on a context embedding of the code context and candidate embeddings of the candidates, where both embeddings are based a common token encoding.

19 Claims, 6 Drawing Sheets

(56) References Cited

OTHER PUBLICATIONS

Proksch, Sebastian, Johannes Lerch, and Mira Mezini. "Intelligent code completion with Bayesian networks." ACM Transactions on Software Engineering and Methodology (TOSEM) 25.1 (2015): pp. 1-31. (Year: 2015).*
Yang, Yixiao, et al. "A language model for statements of software code." 2017 32nd IEEE/ACM International Conference on Automated Software Engineering (ASE). IEEE, 2017.pp. 682-687 (Year: 2017).*
Li, Jian, et al. "Code completion with neural attention and pointer networks." arXiv preprint arXiv: 1711.09573 (2017).pp. 1-7 (Year: 2017).*
Liu, Fang, et al. "A self-attentional neural architecture for code completion with multi-task learning." Proceedings of the 28th International Conference on Program Comprehension. 2020.pp. 37-47 (Year: 2020).*
Terada, Kenta, and Yutaka Watanobe. "Code Completion for Programming Education based on Recurrent Neural Network." 2019 IEEE 11th International Workshop on Computational Intelligence and Applications (IWCIA). IEEE, 2019.pp. 109-114 (Year: 2019).*
"PyCharm Code Completion", Retrieved from: https://www.jetbrains.com/help/pycharm/auto-completing-code.html, Retrieved Date: Jul. 17, 2020, 13 Pages.
"IntelliJ Code Completion", Retrieved from: https://www.jetbrains.com/help/idea/auto-completing-code.html. Retrieved Date: Jul. 17, 2020, 18 Pages.
"Code Recommenders", Retrieved from: http://web.archive.org/web/20190526205020/http://www.eclipse.org/recommenders/, May 26, 2019, 3 Pages.
"IntelliSense", Retrieved from: https://code.visualstudio.com/docs/editor/intellisense, Retrieved Date: Jul. 17, 2020, 7 Pages.
"TabNine" Retrieved from: http://web.archive.Org/web/20200320050439/https://tabnine.com/, Mar. 20, 2020, 3 Pages.
Allamanis, et al., "A Survey of Machine Learning for Big Code and Naturalness", In the Journal of ACM Computing Surveys (CSUR), vol. 51, Issue 4, Jul. 2018, 37 Pages.
Allamanis, et al., "Learning to Represent Programs with Graphs", In Proceedings of the 6th International Conference on Representation Learning, Apr. 30, 2018, pp. 1-17.
Allamanis, et at., "Mining Source Code Repositories at Massive Scale using Language Modeling", In Proceedings of 10th Working Conference on Mining Software Repositories, May 18, 2013, pp. 207-216.
Allamanis, et al., "Suggesting Accurate Method and Class Names", In Proceedings of the Joint Meeting of the European Software Engineering Conference and the Symposium on the Foundations of Software Engineering, Aug. 30. 2015, pp. 38-49.
Allamanis, Miltiadis, "The Adverse Effects of Code Duplication in Machine Learning Models of Code", In Proceedings of the ACM SIGPLAN International Symposium on New Ideas, New Paradigms, and Reflections on Programming and Software, Oct. 23, 2019, pp. 143-153.
Amann, et al., "A Study of Visual Studio Usage in Practice", In Proceedings of the IEEE 23rd International Conference on Software Analysis, Evolution, and Reengineering (SANER), Mar. 14, 2016, pp. 124-134.
Attenberg, et al., "Feature Hashing for Large Scale Multitask Learning", In Proceedings of the International i Conference of Machine Learning (ICML) Jun. 14, 2009, 9 Pages.
Bahdanau, et al., "Neural Machine Translation by Jointly Learning to Align and Translate", In Proceedings of International Conference on Learning Representations, May 7, 2015, pp. 1-15.
Bielik, et al., "PHOG: Probabilistic Model for Code", In Proceedings of the 33rd International Conference on Machine, Jun. 19, 2016, 10 Pages.
Brockschmidt, et al., "Generative Code Modeling with Graphs", In Proceedings of the 7th international Conference on Learning Representations, May 6, 2019, 24 Pages.

Bruch, et al., "Learning from Examples to Improve Code Completion Systems". In Proceedings of the 7th joint Meeting of the European Software Engineering Conference and the ACM SIGSOFT International Symposium on Foundations of Software Engineering, 2009, Aug. 23, 2009, 10 Pages.
Courbariaux, el al., "Training Deep Neural Networks with Low Precision Multiplications", In Repository of arXiv:1412.7024, Sep. 23, 2015, 10 Pages.
Devlin, et al., "BERT: Pre-training of Deep Bidirectional Transformers for Language Understanding", In Repository of arXiv:1810.04805, Oct. 11, 2018, 14 Pages.
Feng, et al., "CodeBERT: A Pre-Trained Model for Programming and Natural Languages", In Repository of arXiv:2002.08155, Feb. 19, 2020, 10 Pages.
Franks, et al., "Cacheca: A Cache Language Model Based Code Suggestion Tool", In Proceedings of the 37th IEEE International Conference on Software Engineering, May 16, 2015, pp. 705-708.
Goodfellow, et al., "Deep Learning", In Publication of MIT Press, Nov. 2016, 766 Pages.
Gutmann, et al., "Noise-Contrastive Estimation of Unnormalized Statistical Models, with Applications to Natural Image Statistics", In Journal of Machine Learning Research, vol. 13, Issue 1, Feb. 2012, pp. 307-361.
Hellendoorn, et al., "Are Deep Neural Networks the Best Choice for Modeling Source Code?", In Proceedings of the 11th Joint Meeting on Foundations of Software Engineering, Sep. 4, 2017, pp. 763-773.
Hellenooorn, et al., "When Code Completion Fails: A Case Study on Real-World Completions", In Proceedings of the IEEE/ACM 41st International Conference on Software Engineering (ICSE), May 25, 2019, pp. 960-970.
Hindle, et al., "On the Naturalness of Software", In Proceedings of the 34th International Conference on Software Engineering, Jun. 2, 2012, pp. 837-847.
Hochreiter, et al., "Long Short-Term Memory", In Journal of Neural Computation, vol. 9, Issue 8, Nov. 15, 1997, p. 1735-1780.
Inan, et al., "Tying Word Vectors and Word Classifiers: A Loss Framework for Language Modeling", In repository of arXiv:1611.01462, Nov. 4, 2016, 10 Pages.
Karampatsis, et al., "Big Code != Big Vocabulary: Open-Vocabulary Models for Source Code", In Proceedings of the 42nd Internatic ial Conference on Software Engineering (ICSE), May 23, 2020, 13 Pages.
Kim, et al., "Character-Aware Neural Language Models", In Proceedings of the Thirtieth AAAI Conference on Artificial Intelligence, Feb. 12, 2016, pp. 2741-2749.
Kim, Yoon, "Convolutional Neural Networks for Sentence Classification", In repository of arXiv:1408.5882, Aug. 25, 2014, 6 Pages.
Kudo, et al., "SentencePiece: A Simple and Language Independent Subword Tokenizer and Detokenizer for Neural Text Processing", In Proceedings of the Conference on Empirical Methods in Natural Language Processing (System Demonstrations), Oct. 31, 2018, pp. 66-71.
Kuhn et al., "A Cache-Based Natural Language Model for Speech Recognition", In Journal of IEEE Transactions on Pattern Analysis and Machine Intelligence, vol. 12, Issue 6, Jun. 1990, pp. 570-583.
Lopes, et al., "DejaVu: A Map of Code Duplicates on GitHub", In Proceedings of the ACM on Programming Languages, vol. 1, Oct. 2017, 28 Pages.
Maddison, et al., "Structured Generative Models of Natural Source Code", In Proceedings of the 31st International Conference on Machine Learning, Jun. 21, 2014. 9 Pages.
Mikolov, et al., "Distributed Representations of Words and Phrases and their Compositionality", In Proceedings of Advances in Neural Information Processing Systems, Dec. 5, 2013, 9 Pages.
Miller, George A.., "The Magical Number Seven, Plus or Minus Two: Some Limits on Our Capacity for Processing Information", In Journal of Psychological Review, vol. 63, Issue 2, Mar. 1956, pp. 81-97.
Moody, John, "Fast Learning in Multi-Resolution Hierarchies", In Journal of Advances in Neural Information Processing Systems, 1989, pp. 29-39.

(56) References Cited

OTHER PUBLICATIONS

Murphy, et al., "How Are Java Software Developers Using the Eclipse IDE?", In Journal of IEEE Computer Society. vol. 23, issue Jul. 4, 17, 2006. pp. 76-83.
Nguyen, et al , "A Statistical Semantic Language Model for Source Code", In Proceedings of the 9th Joint Meeting on Foundations of Software Engineering, Aug. 18, 2013, pp. 532-542.
Proksch, et al., "Intelligent Code Completion with Bayesian Networks", In Journal of ACM Transactions on Software Engineering and Methodology (TOSEM),vol. 25, Issue 1, Nov. 2015, 31 Pages.
Radford, et al., "Language Models are Unsupervised Multitask Learners", In Journal of OpenAI Blog, vol. 1, issue 8, Feb. 24, 2019, 24 Pages.
Raychev, et al., "Code Completion With Statistical Language Models", In Proceedings of the 35th ACM SIGPLAN Conference on Programming Language Design and Implementation, Jun. 9, 2014, pp. 419-428.
Sennrich, et al., "Neural Machine Translation of Rare Words with Subword Units", In Proceedings of the 54th Annual Meeting of the Association for Computational Linguistics, Aug. 7, 2016, pp. 1715-1725.
Svyatkovskiy, el al., "Pythia: AI-assisted Code Completion System", In Proceedings of the 25th ACM SIGKDD International Conference on Knowledge Discovery & Data Mining, Aug. 4, 2019, pp. 2727-2735.
Tang, et al., "Distlling Task-Specific Knowledge from BERT into Simple Neural Networks", In Repository of arXiv.1903.12136, Mar. 28, 2019, 8 Pages.
Tu, et al., "On the Localness of Software", In Proceedings of the 22nd ACM SIGSOFT International Symposium on Foundations of Software Engineering, Nov. 16, 2014, pp. 269-280.
Vaswani et al., "Attention Is All You Need", In Proceedings of the 31st Conference on Neural Information Processing Systems, Dec. 4, 2017, 11 Pages.
Zhang, "Character-level Convolutional Networks for Text Classification", In Journal of in Advances in Neural Information Processing Systems, Dec. 7, 2015. 9 Pages.
Hogenson, et al., "intellicode/overview.md", Retrieved From: https://github.com/MicrosoftDocs/intellicode/blob/c0eccde6ac07dce2296902aa79d783de5c350b6f/docs/overview.md#context-awarecode-completions, Aug. 6, 2019, 4 Pages.
"International Search Report & Written Opinion Issued in PCT Application No. PCT/US2021/013263", dated May 10, 2021, 32 Pages.

\* cited by examiner

NEURAL CODE COMPLETION VIA RE-RANKING

CROSS-REFERENCE TO RELATED APPLICATIONS

The present application claims the benefit of the earlier filed provisional application having Ser. No. 62/985,857 filed on Mar. 5, 2020, which is incorporated by reference in its entirety.

BACKGROUND

Software development environments are often used to aid software developers (i.e., users, programmers, etc.) to develop program code. The software development environment may include a source code editor and other tools that a developer utilizes to write and test their programs. Some software development environments include a code completion feature that provides assistance while the developer is editing code by automatically presenting a list of possible candidates based on one or more characters (e.g., letters, symbols, etc.) that a developer has typed into a source code editor. A popup menu may appear with several suggested code elements that the developer may utilize. The suggested code elements are based on the data type or namespace associated with the characters typed before a trigger character. This assistance is beneficial since it speeds up the development time and reduces common errors, such as typos.

However, the automatic code completion feature may be problematic when the code completion system requires a lot of memory, takes too long to generate a list of candidates, and/or generates a list of candidates that are not relevant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A neural code completion system ranks valid code completion suggestions generated from a static analyzer in a manner that improves the speed, memory efficiency, and coverage of completions in unseen code. The static analyzer generates valid candidate suggestions without the use of machine learning techniques in an unordered list. Neural components are used to re-rank the candidate suggestions rather than generate the code suggestions while achieving a 90% recall without incurring the computational overhead and increased memory consumption needed to generate the code completion suggestions.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
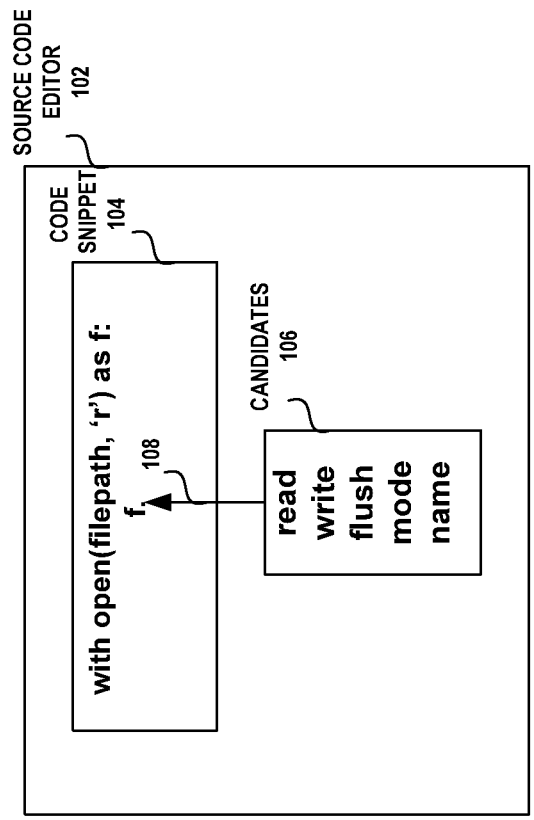
FIG. 1 is a schematic diagram illustrating an exemplary code completion system providing candidate suggestions to complete a partially-formed method invocation.

The subject matter disclosed pertains to the generation of candidates to automatically complete a code snippet in a program development environment. A code snippet may consist of various elements (e.g., keywords, delimiters, variables, methods, constants, operators, etc.) that are combined in a particular order in accordance with the grammar of the underlying programming language to form an expression. The code snippet may be a method invocation, a program statement, a definition, an expression, and so forth. Code completion is a tool that attempts to predict the next string of characters that a developer (e.g., user, end-user, programmer, etc.) may type into a program development environment (e.g., source code editor, integrated development environment (IDE)) to complete the code snippet.

Code completion relies on a candidate provider to provide candidates to complete the code snippet. The candidate provider may be a static analyzer that parses the source code to determine the data types of the program elements within a completion context and generates a set of valid candidates to complete the code snippet. The set of candidates are derived from the data type or namespace of the characters that are input before a trigger character. The static analyzer does not utilize machine learning techniques, such as neural networks, Markov models, encoders, and the like.

Code completion runs in real-time and requires fast computational speed and a memory efficient configuration in order to compute a single candidate in a few milliseconds while achieving 90% recall in the top five candidates. The code completion system disclosed herein improves speed, memory efficiency, coverage, and generalization capabilities to unseen code by reformulating the problem of code completion from generation to ranking. The technique described herein re-ranks candidates produced from a pre-existing candidate provider without maintaining a memory-intensive vocabulary and embedding matrix.

The code completion system uses an existing static analyzer to generate more precise candidates which are re-ranked using neural components to improve the speed and memory consumption of the code completion task. The static analyzer returns an unordered list of type-correct candidates, narrowing down the list of suggestions. The neural encoder can then find which candidates from the list suggested by a static analyzer are the most relevant in the given context, having learned from a large codebase.

The static analyzer computes a cost effective and focused list of candidates which reduces the computational cost of the code completion. However, the static analyzer cannot learn features from the data to generalize to unseen data. Neural models are able to compensate for this limitation by learning features, such as the structure of the source code, the names of the variables, the functions appearing in a given context, to comprehend and generate these features to unseen data. For example, the name of the variable, array__inner_product, indicates that a developer is about to invoke an algebraic function, such as a dot method, to compute an inner product. A static analyzer would not be able to use the name of a variable to learn aspects from the name that are relevant to a completion context. Neural models are capable of learning features from the data that are relevant to the completion context in order to generalize to unseen source code.

The code completion system encompasses a token encoder, a context encoder, a static analyzer, and a re-ranker. The token encoder is a neural network, $\varepsilon$, that encodes a code token t into a distributed vector representation or token embedding, $r_t$. The context encoder is a neural network C that encodes or summarizes the code context $t_{cx}$, into a distributed vector representation or embedding, $c_{cx}$. The static analyzer is a component that accepts the code context $t_{cx}$, and yields an unordered set of M candidates $s_i$, where $P(t_{cx})=\{s_i\}=\{s_0, \ldots, s_M\}$. The re-ranker is a neural component R that accepts the context embedding $c_{cx}$ along with the completion candidates, $\{s_i\}$ and ranks them from highest probability to lowest probability. The re-ranker ranks the completion candidates by computing a probability distribution that considers the token embedding for each token of a completion candidate and the context embedding. The top k completion candidates, having the highest probability, are then returned to the developer.

Attention now turns to a more detailed description of the system, components, and method used to perform code completion.

System

FIG. 1 illustrates a code completion system 100 utilizing a static analyzer within a neural network architecture. The code completion system 100 is used within a source code development tool, such as a source code editor, integrated development environment (IDE), and the like. As shown in FIG. 1, a portion of a source code program is edited in a source code editor 102. The user interface of the source code editor 102 shows a code snippet 104 written in the Python programming language, with open(filepath, 'r') as f:. The developer is about to type in a method name to complete a method invocation of a method in the class f. The source code editor 102 detects a marker character, such as the dot character after the class name f, ".", and generates candidates 106 to complete the method invocation. A pop-up window appears after a marker character 108 which lists candidates to complete the method invocation. The candidates are shown in a ranked order from highest probability to least probability and include read, write, flush, mode, and name.

Figure 2:
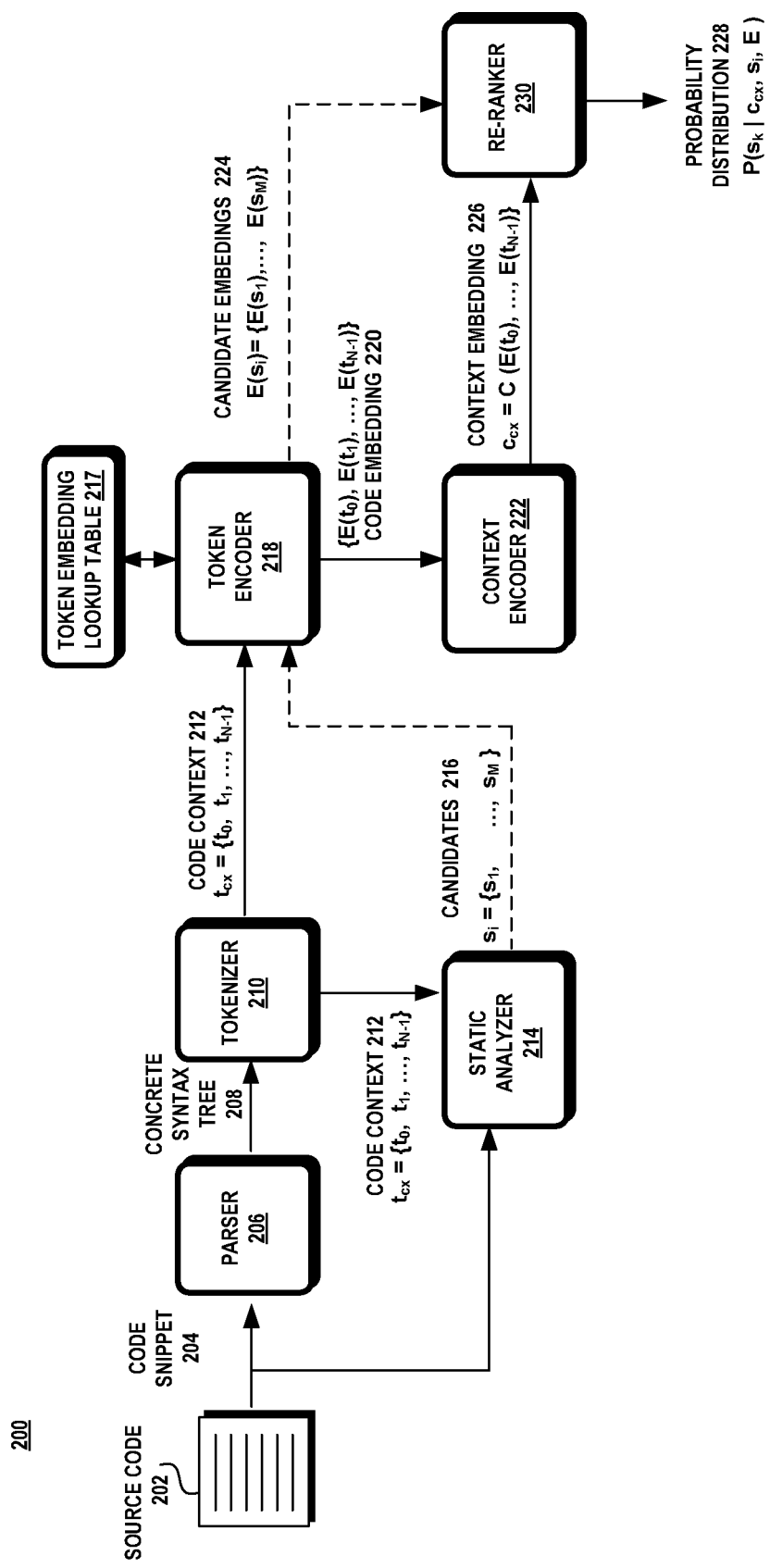
FIG. 2 is a schematic diagram illustrating the components used in an exemplary re-ranking code completion system.

FIG. 2 shows the components of a code completion system 200 for re-ranking the completion candidates generated from an existing candidate provider. The code completion system 200 includes a parser 206, a tokenizer 210, a static analyzer 214, a token encoder 218, a context encoder 222, a token embedding lookup table 217, and a re-ranker 230. The parser 206 receives a code snippet 204 from a source code program 202. The source code program 202 may be edited in a source code development tool.

The code snippet 204 represents the current context of the source code program. In one aspect, the code completion system is used to predict a candidate to complete a partially-formed method invocation. The code context is a fixed-length ordered sequence of tokens prior to the marker character. In order to obtain the completion context, the parser generates a concrete syntax tree 208 from the code snippet 204. The concrete syntax tree 208 is traversed by the tokenizer 210 to generate a T-length ordered sequence of tokens referred to as the code context, 212, $t_{cx}=\{t_0, t_1, \ldots, T_{N-1}\}$.

The concrete syntax tree 208 represents the syntactic structure of the code context in a hierarchical or tree structure. The concrete syntax tree 208 is an n-ary tree data structure that includes nodes that represent a construct in the grammar of the programming language of a program. The concrete syntax tree 208 includes one root node, multiple internal nodes, and multiple terminal nodes. The terminal nodes represent the tokens. A token is a symbol that represents an operand or an operator. The parser 206 outputs an ordered sequence of T tokens that represent the code context, where T is the length of the ordered sequence.

The code context 212 is input into the static analyzer 214. The static analyzer 214 generates candidates 216 to complete the method invocation. There may be several candidates $s_i=\{s_i, \ldots, s_M\}$ 216. Each candidate is input into the token encoder 218. The token encoder 218 generates a candidate embedding 224 for each candidate that includes a token embedding for each token in a candidate, 224, $\varepsilon(s_i)=\{\varepsilon(s_1), \ldots, \varepsilon(s_M)\}$.

The code context 212 is also input into a token encoder 218 which generates an encoding or embedding for each token in the code context which is referred to as the code embedding 220, $\varepsilon(t_0), \ldots, \varepsilon(t_{N-1})$. The code embeddings 220 are stored in a token embedding lookup table 217. The code embedding 220 is then input into a context encoder 222 to generate a context embedding 226, $c_{cx}=C$ ($\varepsilon(t_0), \ldots, \varepsilon(t_{N-1})$).

The re-ranker 230 receives each candidate embedding 224 and the context embedding 226 and ranks a candidate according to the probability distribution: $P(s_k|c_{cx}, \{s_i\}, \varepsilon)=[\exp((Wc_{cx})^T \varepsilon(s_k)]/[\Sigma s_j \varepsilon \{s_i\} \exp((W c_{cx})^T \varepsilon(s_i)]$, which is the softmax function over the dot product of the token encodings of the candidate suggestions with a linearly transformed context encoding $c_{cx}$.

Figure 3:
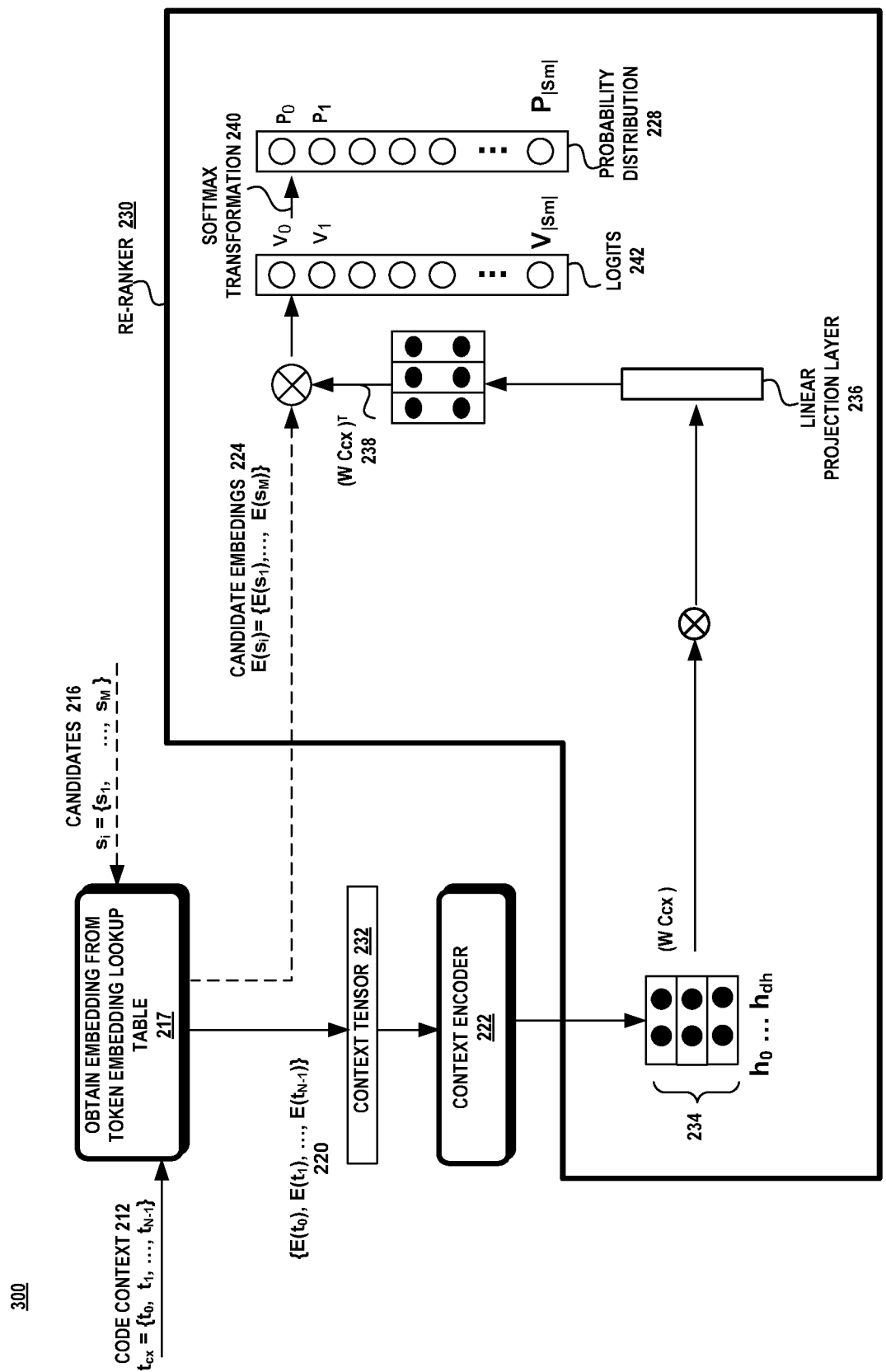
FIG. 3 is a schematic diagram illustrating the computational process of the re-ranking.

FIG. 3 illustrates the computation of the probability distribution in further detail. During code completion, the code context 212 and the candidates 216 are generated. The embeddings for each token in the code context 212 is obtained from the token embedding lookup table 217 to form context tensor 232. The context tensor 232 is input into the context encoder 222 which generates the weight $Wc_{cx\ 234}$ which is transposed by the linear projection layer 236 into $Wc_{cx}^T$ 238. The dot product of $\varepsilon(s_k)$ and $Wc_{cx}$ is formed resulting in logits 242, with a softmax transformation 240 applied to generate the probability distribution, softmax prediction 228.

Hence, the re-ranker 230 includes a linear projection layer 236 and a softmax transformation layer 240 which is used to compute the probability distribution 240 for each candidate as noted above.

Token Encoders

The token encoder 218 is a neural network that encodes a code token into a vector representation or embedding. There are different types of token encoders that may be utilized. The token encoder 218 may be a token-unit encoder which is a neural network that learns an embedding $\varepsilon$ of dimension D for each token t in a fixed vocabulary V. An embedding matrix is used to store the embedding for each token in the vocabulary. During code completion, a lookup is performed to obtain the embedding from the embedding matrix, such as, $\varepsilon_{TOKEN}(t)$=EmbeddingLookUp(t, V), where EmbeddingLookUp returns the D-dimensional row of the embedding matrix that corresponds to t.

A subtoken encoder may also be used as the token encoder 218. A subtoken encoder splits certain tokens into a smaller portion. Unlike a natural language (e.g., English, etc.), programmers use, at times, arbitrary, complex and long names to represent a variable, function or other code elements which may result in an extremely large vocabulary for the model when a large number of source code programs are used to train the model. To reduce the size of the vocabulary and embedding matrix, less-frequently occurring tokens are split into subtokens. A subtoken is a portion of a token that is in between a token and a single character. The subtokens are used to account for rare or unseen tokens (i.e., out-of-vocabulary tokens) that may appear in a target source code program. The use of the subtokens allows the model to learn and generate the out-of-vocabulary tokens.

Obtaining a representation of a token t requires composing the representation from the subtoken embedding that constitutes the token which may be performed as follows:

$$\varepsilon_{SUBTOKEN}(t) = \otimes_{t_s \in SPLIT(T)} \text{EmbeddingLookUp}(t_s, V_s),$$

where SPLIT is a function that subtokenizes its input and returns a set of subtokens, the operator ⊗ is an aggregation operator that summarizes the meaning of a single token from its subtokens.

Byte-pair encoding is another type of an encoder that may be used as the token encoder 218. Byte pair encoding is a data compression technique in which most frequently co-occurring pairs of Unicode characters throughout the training source code dataset are substituted with an out-of-vocabulary character. When applied recursively, the byte pair encoding results in an extraction of token/subtokens in sequences of frequently co-occurring Unicode characters. In one aspect, byte pair encoding is used to extract ordered sequences of Unicode characters to form tokens and/or subtokens.

The token encoder 218 may be implemented as a character encoder. Character-based encoding composes a representation of a token from the individual characters. A benefit of a character-based encoder is that the neural network has a smaller number of parameters compared with other encoders and the encoder can represent arbitrary tokens as long as they are made from known characters. Representations of tokens are then computed without involving a lookup table. The encoder stores the parameters of the neural network and has no vocabulary.

There is a trade-off with the character-based encoding since the neural network has a smaller representational capacity but is more computationally expensive. For a token, $\varepsilon_{CHAR}(t) = 1D\ CNN\ (GetChars(t))$, where 1D CNN is a one-dimensional convolutional neural network (CNN) and GetChars splits t into a list of characters. An alphabet is constructed that includes the commonly-used characters present in the data. Each token is then represented as a matrix of one-hot columns in which the element corresponding to the relevant index in the alphabet is set to 1.

It should be noted that the term "token" is relative to the type of token encoder that is implemented. As such, the term "token" refers to a subtoken, character, or token based on the implementation of the type of token encoder.

Context Encoders

A context encoder 222 is a neural network C that encodes or summarizes the code context $t_{cx}$ into a distributed vector representation or embedding, $c_{cx}$, of the form: $c_{cx} = C(\varepsilon(t_0), \ldots, \varepsilon(t_{N-1}))$. The context encoder 222 accepts as input the N context tokens before the completion location and generates a token encoding for the sequence of N tokens. The output vector $c_{cx}$ is an H-dimensional vector, where H is a hyperparameter.

The context encoder 222 is a neural network. In general, a neural network is a machine learning model that uses one or more layers of non-linear units to predict an output for a received input. A context encoder 222 may be a variant of a Recurrent Neural Network (RNN), a Convolutional Neural Network (CNN), or a transformer. A Gated Recurrent Unit (GRU) or Long Short-Term Memory (LSTM) neural network are variants of a Recurrent Neural Network (RNN).

An RNN is a type of neural network that is characterized by a recurrent loop, where the hidden state $h_t$ depends on the current observation or token, $t_v$, and relies on the previous hidden state $h_{t-1}$. RNN encoders take the form, $h^{(v)} = f(h^{(v-1)}, t_{v-1})$, where $h^{(v)}$ is the vector state at position v, $t_v$ is the encoding of the input at time v, and f is the learned non-linear function. A GRU is a type of recurrent neural network that contains gating units for the hidden states. The output of a GRU encoder is $C_{GRU}(t_{cx}, \varepsilon) = h^{(N)}$.

A LSTM is a type of recurrent neural network capable of learning order dependence in sequential patterns using a gradient-based learning algorithm. In general, the LSTM architecture includes an input layer, one or more hidden layers in the middle with recurrent connections between the hidden layers at different times, and an output layer. Each layer represents a set of nodes and the layers are connected with weights. The input layer xt represents an index at position t in a vocabulary |V| and the output layer $y_t$ produces a probability distribution that the token at position t in the vocabulary is likely to complete a method invocation. The hidden layers $h_t$ maintain a representation of the history of the training data. Gating units are used to modulate the input, output, and hidden-to-hidden transitions in order to keep track of a longer history of the training data.

A CNN is feed forward neural network with alternating convolutional subsampling layers. A one-dimensional CNN (1D CNN) can be used to encode the context into a single vector. The 1D CNN encoder accepts an N×D matrix and after a few layers of convolution, a pooling layer is used to compute the final H-dimensional context encoding $c_{cx}$.

A transformer is a neural network architecture that handles dependencies between its input and output with attention without using recurrent neural networks (RNN). Attention is a mechanism that identifies which parts of an input sequence are relevant to each token/subtoken in the output sequence. The attention mechanism allows the transformer to access the entire input sequence all at once. The transformer may act as the context encoder that maps an input sequence of symbol representations to a sequence of continuous representations. However, it should be noted that although transformers can be parallelized efficiently, they have quadratic runtime memory requirements with respect to sequence length.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
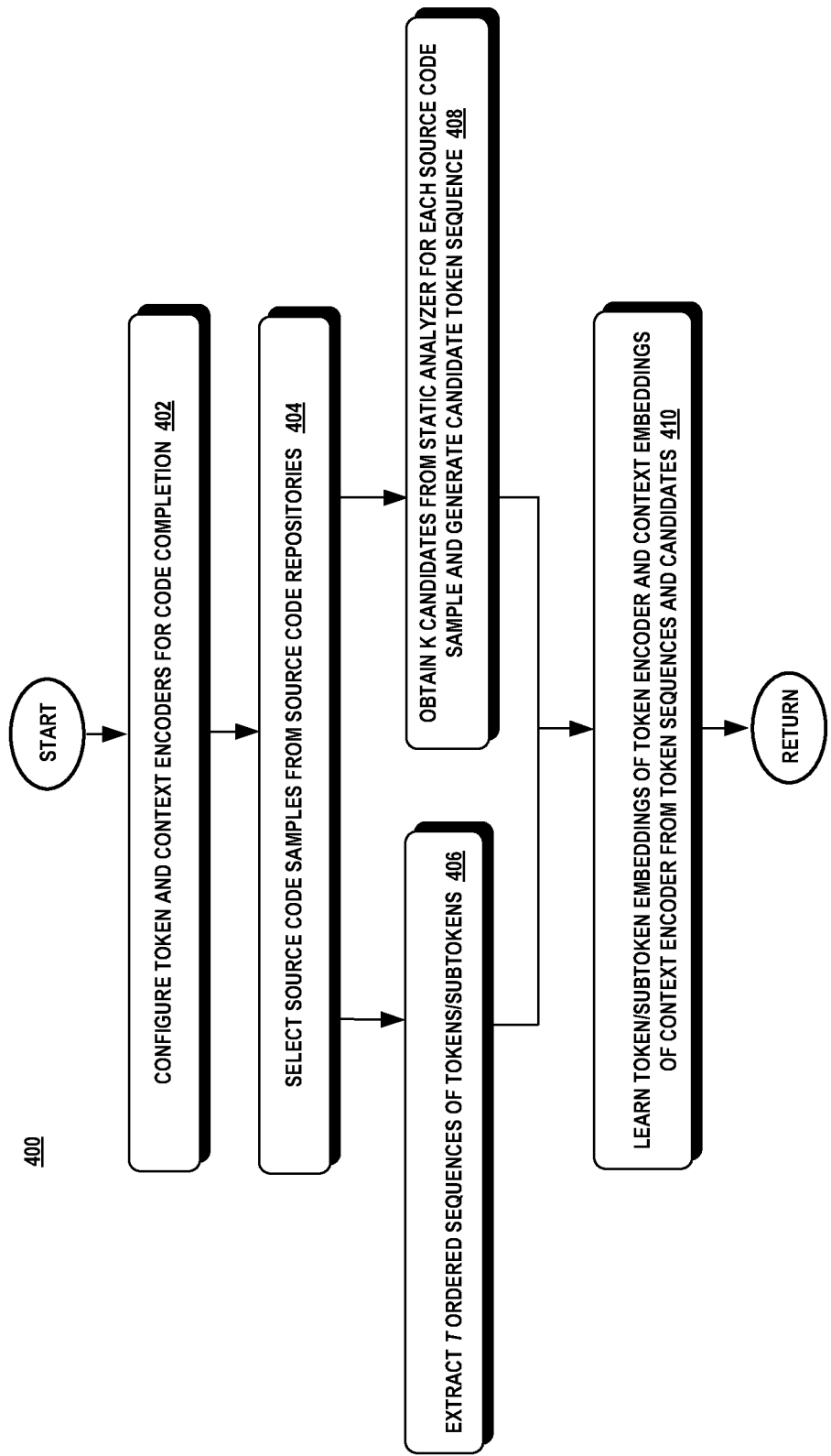
FIG. 4 is a flow diagram illustrating an exemplary method for training the neural encoders used in the re-ranking code completion system.

FIG. 4 illustrates an exemplary method 400 for training the neural components of the code completion system. The training of a neural network is a complicated and time-consuming task since there is no method to select the optimal parameters for a neural network without testing and validating the neural network to meet a target objective. The training of a neural network, such as the token encoder and context encoder, requires a configuration of the architecture of the token encoder and the context encoder, such as one of the architectures described above. In addition, a set of parameters must be defined such as the number of hidden layers, the number of neurons in each layer, and the back-propagation method used to train the encoders.

In addition, a set of hyperparameters is selected randomly. A hyperparameter is a parameter associated with the neural network model architecture, the training algorithms, and data normalization, which is set before the start of the training. A hyperparameter is not learned by the neural network. The hyperparameters are selected at random from a set of categorical values or, for real valued hyperparameters like learning rate, drawn at random from a given range. Hyperparameters are tuned based on the performance of the neural network when tested using the validation dataset.

The training of the neural transformer model is a computationally intensive effort which requires parallel data processing. One or more clusters may be used to train the neural transformer model where each cluster contains a set of loosely or tightly coupled computers (e.g., processors, processing units, cores) that perform the same task simultaneously under the control of distributed controller. Each computer works off the same copy of the neural transformer model and uses distributed data parallel training algorithms to synchronize the processing between the clusters.

The encoders are trained using batching where the training dataset is partitioned into batches of a certain size and processed before the model is updated. The size of a batch must be more than or equal to one and less than or equal to the number of samples in the training dataset. A portion of the sequences are used as the training dataset and another portion is used as the validation dataset. The training dataset is partitioned into epochs and then the sequences in each epoch are partitioned into batches. Each sequence in each batch in each epoch is then used to train the neural transformer model.

Initial values are generated for the token embeddings and parameters of the context encoder. The token encoder learns the token embeddings from the training dataset which are stored in a token embedding matrix for use in the interference phase. The context encoder learns its parameters from the training dataset.

The training dataset for the token encoder and the context encoder consists of T-length ordered sequences of tokens obtained from source code methods from one or more source code repositories (block 404). The one or more source code repositories are searched for source code methods. Each source code method may be written in the same or in different programming languages. The source code repositories can be widely-used code repositories, such as GitHub, internal code repositories, and/or combinations thereof. The number and type of source code programs that meet an intended objective, such as source code programs that are accessed frequently, source code programs that utilize a particular function (e.g., database operations, computer graphics programs, asynchronous methods, etc.), and the like. These source code programs are used to generate training and validation datasets. (Collectively, block 404).

The source code methods are input into the static analyzer (block 408) concurrently as a tokenizer extracts ordered sequences of tokens from the sampled source code methods (block 406). The static analyzer generates suggested candidates which are input into the token encoder to learn a token embedding for each token in a candidate (block 408). The candidate embedding is input into the context encoder for the context encoder to learn a corresponding embedding (block 410). The T-length ordered sequence of tokens from the sampled source code methods are also input into the token encoder (block 410). At the completion of the training, the token embeddings are stored in a token embedding matrix for use in the re-ranking phase (block 410).

Figure 5:
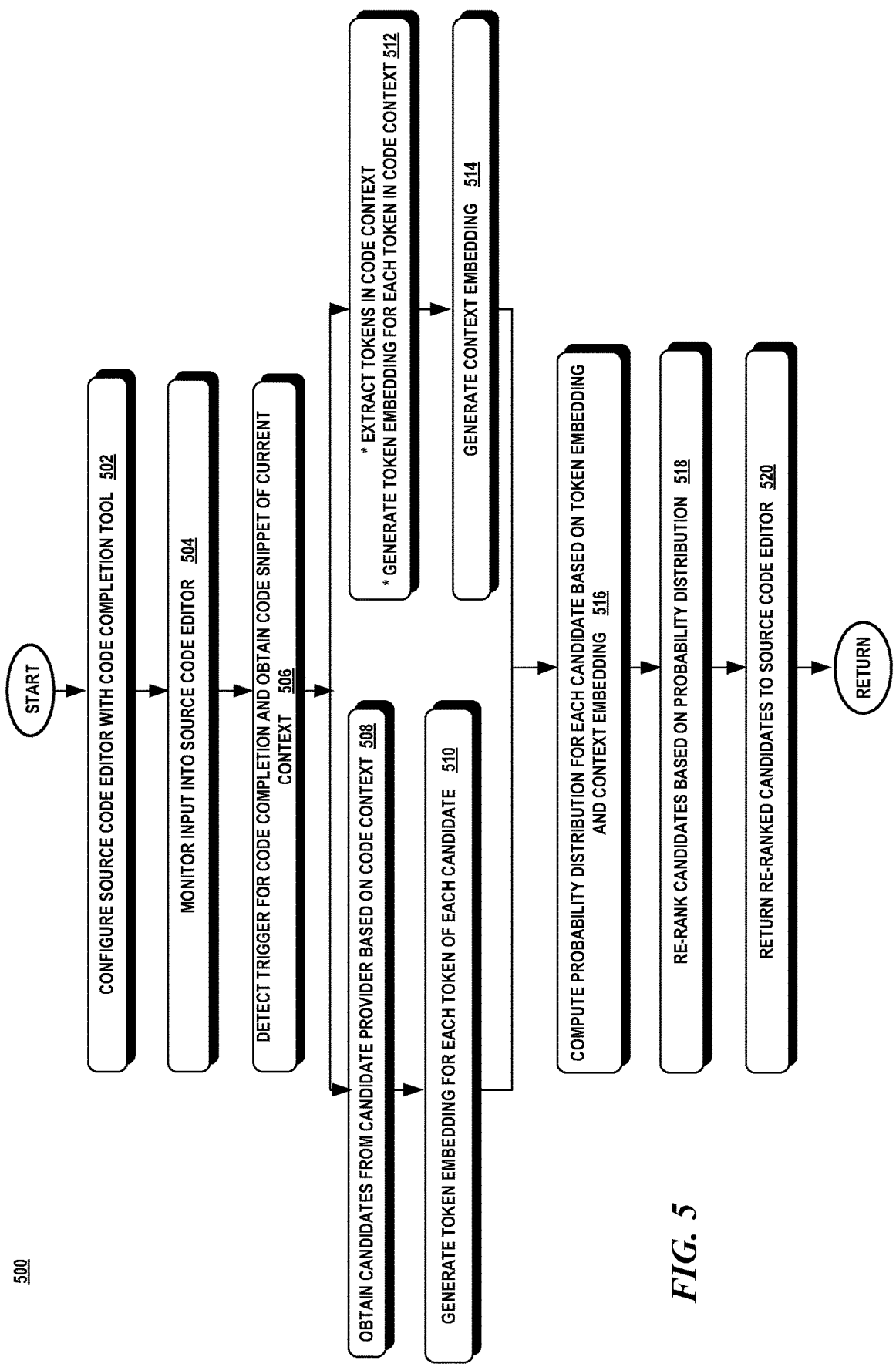
FIG. 5 is a flow diagram illustrating an exemplary method for re-ranking the candidate suggestions.

FIG. 5 illustrates an exemplary method 500 of a re-ranking code completion system. Referring to FIGS. 3 and 5, initially, a source code development system is configured with the re-ranking code completion system. In one or more aspects, code completion may be a function or feature integrated into a source code editor and/or IDE. Code completion may be embodied as a tool or feature that can be an add-on, plug-in, extension and/or component of a source code editor and/or IDE. (Collectively, block 502).

A background parsing process parses the source code in the source code editor to generate and update a syntax tree and semantic model of the source code (block 504).

A user interface of the source code editor detects the input characters that a developer enters into the source code editor. When the user interface detects a particular character that denotes code completion is needed for a method invocation at a current position in the source code editor, the user interface requests candidates from the code completion system. In one aspect, the detection of a period after a class name is used as the trigger to invoke code completion. Upon detection of the trigger, the current code context 212 is extracted from the user interface. (Collectively, block 506).

The current code context is input into the static analyzer which produces one or more candidates 216 to complete the partially-formed method invocation (block 508). The token embedding for each token in the candidate is obtained from the token embedding lookup table 217 thereby generating a candidate embedding 224 (block 510).

Concurrently with blocks 508 and 510, the tokenizer extracts tokens from the code context 212 and obtains the token embedding 220 for each token in the code context from the token embedding lookup table 217 thereby generating the context tensor 232 (block 512). The context tensor 232 is input into the context encoder 222 (block 514).

The output hidden state of the context encoder 234 is multiplied by the linear projection layer 236. By computing the dot product of the embedding of each candidate with the output of the linear projection layer, the logits predictions 242 are retrieved. Finally, a probability distribution for each token used in a candidate is generated by getting the unnormalized logits predictions 242 which are normalized using a softmax transformation function 240 into the probability distribution 228 (i.e., softmax prediction) (Collectively, block 516).

The candidates recommended by the static analyzer are then re-ranked in accordance with the probability distribution (block 518) and the re-ranked list of candidates is provided back to the source code editor (block 520). In one aspect, the top k candidates, having the highest probability, are returned, where k is a user-defined parameter (block 520).

Technical Effect

Aspects of the subject matter disclosed herein pertain to the technical problem of getting candidate suggestions to complete a code snippet with more efficient memory usage and increased processing speed with a 90% recall in its top five candidate suggestions. The technical features associated with addressing this problem includes the use of neural components to re-rank the candidate suggestions of an existing static analyzer rather than relying on the neural components to generate the candidate suggestions. Code completion becomes a ranking problem rather than a candidate generation problem and as such, utilizes less memory space and performs faster.

The re-ranking components include a token encoder and a context encoder. The token encoder may be implemented using a variety of ways that can utilize a smaller token embedding matrix. For example, the subtoken encoder uses a finer-level of code token encoding which reduces or completely eliminates the need for a memory-intensive vocabulary and/or embedding matrix.

A context encoder, such as a GRU or LSTM, generates the context encoding in a manner that avoids the gradient vanishing problem. GRU has only two gates (update and reset) and does not use a concept of a cell state thereby having a fast inference speed.

The completion context is treated as the list of N tokens before the completion location which reduces the computational cost of extracting information from the code context. The use of the same encoder for the token encoding and the context encoding simplifies the search space while reducing the number of model parameters.

Exemplary Operating Environment

Figure 6:
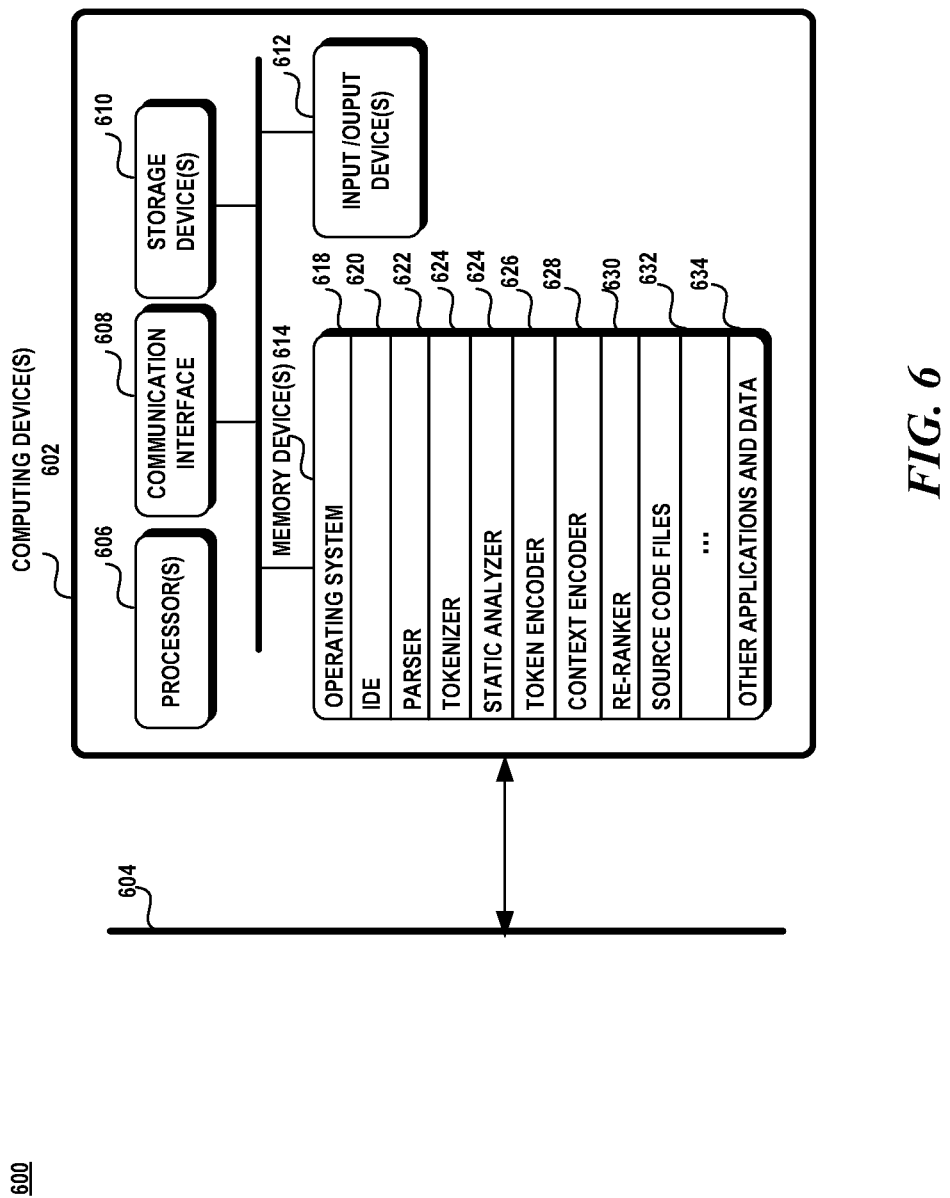
FIG. 6 is a block diagram illustrating an operating environment.

Attention now turns to a discussion of an exemplary operating environment. FIG. 6 illustrates an exemplary operating environment 600 having one or more computing devices 602. In one aspect, one or more computing devices 602 may be used to train the encoders and one or more other computing devices 602 may be used to perform the code completion. However, it should be noted that the aspects disclosed herein is not constrained to any particular configuration of devices. Computing device 602 may be configured as a cloud service that trains the encoders as a service for other code completion systems or provides code completion as a service. It should be noted that the operating environment is not limited to any particular configuration and other configurations are possible.

A computing device 602 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

A computing device 602 may include one or more processors 606, one or more communication interfaces 608, one or more storage devices 610, one or more input/output devices 612, and one or more memory devices 614. A processor 606 may be any commercially available or customized processor and may include dual microprocessors and multi-processor architectures. A communication interface 608 facilitates wired or wireless communications between the computing device 602 and other devices. A storage device 610 may be computer-readable medium that does not contain propagating signals, such as modulated data signals transmitted through a carrier wave. Examples of a storage device 610 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 610 in the computing devices 602. The input/output devices 612 may include a keyboard, mouse, pen, voice input device, touch input device, display, speakers, printers, etc., and any combination thereof.

A memory device 614 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 614 may also include one or more external storage devices or remotely located storage devices that do not pertain to propagated signals, such as modulated data signals transmitted through a carrier wave.

Computing device 602 may utilize an integrated development environment (IDE) 620 that allows a user (e.g., developer, programmer, designer, coder, etc.) to design, code, compile, test, run, edit, debug or build a program, set of programs, web sites, web applications, and web services in a computer system. Software programs can include source code files, created in one or more source code languages (e.g., Visual Basic, Visual J #, C++. C #, J #, Java Script, APL, COBOL, Pascal, Eiffel, Haskell, ML, Oberon, Perl, Python, Scheme, Smalltalk and the like). The IDE 620 may provide a native code development environment or may provide a managed code development that runs on a virtual machine or may provide a combination thereof. The IDE 620 may provide a managed code development environment using the .NET framework. It should be noted that this operating embodiment is not constrained to providing the source code development services through an IDE and that other tools may be utilized instead, such as a stand-alone source code editor and the like.

A user can create and/or edit the source code program files 632 according to known software programming techniques and the specific logical and syntactical rules associated with a particular source language via a user interface and a source code editor in the IDE 620. Thereafter, the source code program files 632 can be compiled via a compilation component generating data structures representing the syntactic structure and semantic model of the source code.

The memory device 614 of computing device 602 may contain instructions, components, and data. A component is a software program that performs a specific function and is otherwise known as a module, program, and/or application. The memory device 614 may include an operating system 618, the IDE 620, a parser 622, a tokenizer 624, a static analyzer 624, a token encoder 626, a context encoder 628, a re-ranker 630, source code files 632, and other applications and data 634.

The computing device 602 may be communicatively coupled via a network 604. The network 604 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 604 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/ Real-Time Transport Protocol (SIP/RTP), Short Message Service (SMS), Multimedia Messaging Service (MMS), or any other communication protocols and/or technologies.

CONCLUSION

A system is disclosed having one or more processors and a memory. The memory one or more programs that are configured to be executed by the one or more processors. The one or more programs including instructions that: obtain a plurality of unranked candidates likely to follow a code snippet in a source code development tool from a non-machine-learning-based static analyzer; compute a probability distribution for the unranked candidates, the probability distribution based on a context embedding of a context of the code snippet and a candidate embedding for each unranked candidates; rank each candidate of the plurality of candidates based on the probability distribution; and return k candidates having a highest probability.

In one aspect, the one or more programs include instructions that: generate a context embedding having a token embedding for each token of a context of the code snippet. In an aspect, the one or more programs include instructions that: generate a token embedding from a token encoder, a subtoken encoder, a character encoder, or a byte-pair encoder. In an aspect, the one or more programs include instructions that: generate a context embedding from a Gated Recurrent Neural Network (GRU) encoder, a Long Short-Term Memory (LSTM) encoder, a one-dimensional Convolutional Neural Network (1D CNN) or a neural transformer with attention. In an aspect, the candidate embedding includes a token embedding for each token of a candidate. In an aspect, the probability for each candidate is based on the context embedding and a dot product of the token embedding of a candidate with a linearly transformed context embedding. In one or aspects, the one or more programs are part of an integrated development environment.

A method is discloses comprising: analyzing, through a non-machine learning static analysis, a context of a source code program to generate a plurality of unranked candidates to complete a program element of the source code program under development; generating a context embedding representing the context and a candidate embedding representing the plurality of candidates; computing a probability distribution for the candidates based on the context embedding and a candidate embedding for a respective candidate; and ranking the plurality of candidates based on a respective probability from the computed probability distribution.

In an aspect, the method further comprises providing k candidates having a highest probability for completion of the program element. In an aspect, the method further comprises extracting tokens from each candidate; and computing a candidate embedding for a candidate as a combination of token embeddings for each token of a candidate. In an aspect, a token embedding is derived from a subtoken encoder, a token-unit encoder, a character encoder, or a byte-pair encoder. In an aspect, the method further comprises generating the context embedding from a token encoding of the context applied to a neural context encoder. In an aspect, the neural context encoder is a Gated Recurrent Unit (GRU), a Long Short-Term Memory (LSTM), a one-dimensional Convolutional Neural Network (1D CNN), or a transformer. In one or more aspects, the computer-implemented method is implemented in a source code editor or integrated development environment. In one or more aspects, the computer-implemented method is implemented in a cloud service.

A device is disclosed comprising: at least one processor and a memory. The at least one processor is configured to: obtain an unordered list of candidates to complete a code snippet in a source code program using a non-neural static analysis based on a context of the code snippet; and rank the unordered list of candidates based on a probability distribution computed from a neural network model, the neural network model configured to generate the probability distribution based on a context embedding of the context and candidate embeddings of the unordered list of candidates, wherein the context embedding and the candidate embeddings are based on a common token embedding.

In one aspect, the at least one processor is further configured to: provide a list of the candidates in descending probability order to the source code program for completion of the code snippet. In an aspect, the common token embedding is produced from a subtoken encoder. In an aspect, the probability distribution is based on a softmax function of the dot product of a linearly transformed context embedding and candidate embedding of each candidate. In an aspect, the neural network model is a Gated Recurrent Unit (GRU) or a Long Short-Term Memory (LSTM) model.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The code completion examples shown herein are not limited to a particular programming language. The components and techniques shown herein are applicable to any programming language.

What is claimed:
1. A system comprising:
one or more processors; and
a memory that stores one or more programs that are configured to be executed by the one or more processors, the one or more programs including instructions that:

generate a plurality of unranked candidates likely to complete a partially-formed code snippet in a source code development tool from a non-machine-learning-based static analyzer;
obtain a context embedding of a context of the partially-formed code snippet and a candidate embedding for each of the plurality of unranked candidates;
compute a probability distribution for the unranked candidates, the probability distribution based on the context embedding of the context of the partially-formed code snippet and the candidate embedding for each of the plurality of unranked candidates;
rank each unranked candidate of the plurality of unranked candidates based on the probability distribution; and
return k ranked candidates having a highest probability.

2. The system of claim 1, wherein the one or more programs include instructions that:
generate the context embedding having a token embedding for each token of the context of the partially-formed code snippet.

3. The system of claim 2, wherein the one or more programs include instructions that:
generate the token embedding from a token encoder, a subtoken encoder, a character encoder, or a byte-pair encoder.

4. The system of claim 2, wherein the one or more programs include instructions that:
generate the context embedding from a Gated Recurrent Neural Network (GRU) encoder, a Long Short-Term Memory (LSTM) encoder, a one-dimensional Convolutional Neural Network (1D CNN) or a neural transformer with attention.

5. The system of claim 1, wherein the candidate embedding includes a token embedding for each token of an unranked candidate.

6. The system of claim 1, wherein the probability for each unranked candidate is based on the context embedding and a dot product of the token embedding of the unranked candidate with a linearly transformed context embedding.

7. The system of claim 1, wherein the one or more programs are part of an integrated development environment.

8. A computer-implemented method, comprising:
analyzing, through a non-machine learning static analysis, a context of a source code program to generate a plurality of unranked candidates to complete a program element of the source code program under development;
generating a context embedding representing the context and a candidate embedding representing the plurality of unranked candidates;
computing a probability distribution for the unranked candidates based on the context embedding and a candidate embedding for a respective unranked candidate;
ranking the plurality of unranked candidates based on a respective probability from the computed probability distribution; and
return k ranked candidates having a highest probability.

9. The computer-implemented method of claim 8, further comprising:
extracting tokens from each unranked candidate; and
computing a candidate embedding for each unranked candidate as a combination of token embeddings for each token of the unranked candidate.

10. The computer-implemented method of claim 9, wherein the token embedding is derived from a subtoken encoder, a token-unit encoder, a character encoder, or a byte-pair encoder.

11. The computer-implemented method of claim 8, further comprising:
generating the context embedding from a token encoding of the context applied to a neural context encoder.

12. The computer-implemented method of claim 11, wherein the neural context encoder is a Gated Recurrent Unit (GRU), a Long Short Term Memory (LSTM), a one-dimensional Convolutional Neural Network (1D CNN), or a transformer.

13. The computer-implemented method of claim 8, wherein the computer-implemented method is implemented in a source code editor or integrated development environment.

14. The method of claim 8, wherein the computer-implemented method is implemented in a cloud service.

15. A device, comprising:
at least one processor and a memory;
wherein the at least one processor is configured to:
obtain an unordered list of candidates to complete a code snippet in a source code program using a non-neural static analysis based on a context of the code snippet;
obtain a context embedding of the context and candidate embeddings of the unordered list of candidates;
rank the unordered list of candidates based on a probability distribution computed from a neural network model, the neural network model configured to generate the probability distribution based on the context embedding of the context and the candidate embeddings of the unordered list of candidates, wherein the context embedding and the candidate embeddings are based on a common token embedding; and
return k ranked candidates having a highest probability.

16. The device of claim 15, wherein the at least one processor is further configured to:
return the k ranked candidates in descending probability order to the source code program for completion of the code snippet.

17. The device of claim 15, wherein the common token embedding is produced from a subtoken encoder.

18. The device of claim 15, wherein the probability distribution is based on a softmax function of the dot product of a linearly transformed context embedding and candidate embedding of each candidate.

19. The device of claim 15, wherein the neural network model is a Gated Recurrent Unit (GRU) or a Long Short-Term Memory (LSTM) model.

* * * * *